(12) United States Patent
Emge et al.

(10) Patent No.: US 7,893,124 B2
(45) Date of Patent: Feb. 22, 2011

(54) METHOD FOR PRODUCING RIGID POLYURETHANE FOAMS

(75) Inventors: Andreas Emge, Lemfoerde (DE); Holger Seifert, Bohmte (DE); Stefan Dinsch, Schipkau (DE); Johann Klassen, Stemwede-Oppendorf (DE); Christian Stelling, Gaste (DE)

(73) Assignee: BASF Aktiengesellscaft, Ludwigshafen (DE)

( * ) Notice: Subject to any disclaimer, the term of this patent is extended or adjusted under 35 U.S.C. 154(b) by 200 days.

(21) Appl. No.: 11/575,719

(22) PCT Filed: Sep. 28, 2005

(86) PCT No.: PCT/EP2005/010491

§ 371 (c)(1),
(2), (4) Date: Mar. 21, 2007

(87) PCT Pub. No.: WO2006/037540

PCT Pub. Date: Apr. 13, 2006

(65) Prior Publication Data

US 2007/0232712 A1    Oct. 4, 2007

(30) Foreign Application Priority Data

Oct. 5, 2004   (DE) .................... 10 2004 048 728

(51) Int. Cl.
*C08G 18/28* (2006.01)
(52) U.S. Cl. ............... 521/167; 521/130; 521/131; 521/170; 521/174
(58) Field of Classification Search ............ 521/130, 521/131, 167, 170, 174
See application file for complete search history.

(56) References Cited

U.S. PATENT DOCUMENTS 5,254,745 A * 10/1993 Jahme .................. 568/613
6,107,355 A * 8/2000 Horn et al. ............... 521/51
6,306,920 B1 * 10/2001 Heinemann et al. ......... 521/174
2003/0065045 A1 * 4/2003 Falke et al. ............... 521/155

FOREIGN PATENT DOCUMENTS

| EP | 0 824 123 | 2/1998 |
| EP | 0 832 909 | 4/1998 |
| EP | 1 138 709 | 10/2001 |
| WO | 00 05289 | 2/2000 |
| WO | 03 027161 | 4/2003 |

* cited by examiner

*Primary Examiner*—John Cooney
(74) *Attorney, Agent, or Firm*—Oblon, Spivak, McClelland, Maier & Neustadt, L.L.P.

(57) ABSTRACT

The invention relates to a process for producing rigid polyurethane foams by reacting
a) polyisocyanates with
b) compounds having at least two hydrogen atoms which are reactive toward isocyanate groups in the presence of
c) blowing agents
wherein a mixture of
b1) a polyether alcohol which has a functionality of 4 and a hydroxyl number of from 380 to 450 mg KOH/g and a viscosity of greater than 12 000 mPa·s and can be prepared by addition of ethylene oxide and/or propylene oxide onto TDA,
b2) a polyether alcohol which has a functionality of from 5 to 7.5 and a hydroxyl number of from 380 to 480 mg KOH/g and can be prepared by addition of propylene oxide onto sucrose and/or sorbitol,
b3) a polyether alcohol which has a functionality of from 2 to 4 and a hydroxyl number of from 140 to 250 mg KOH/g and can be prepared by addition of ethylene oxide and propylene oxide onto TDA or of propylene oxide onto 2-, 3- or 4-functional alcohols, amines other than TDA or castor oil derivatives,
is used as compounds b) having at least two hydrogen atoms which are reactive toward isocyanate groups.

18 Claims, No Drawings

METHOD FOR PRODUCING RIGID POLYURETHANE FOAMS

The invention relates to a process for producing rigid polyurethane foams by reacting polyisocyanates with compounds having at least two hydrogen atoms which are reactive toward isocyanate groups.

Rigid polyurethane foams have been known for a long time and are used predominantly for thermal insulation, e.g. in refrigeration appliances, in hot water storage, in district heating pipes or in building and construction, for example in sandwich elements. A summary over view of the production and use of rigid polyurethane foams may be found, for example, in the Kunststoff-Handbuch, Volume 7, Polyurethane, 1st edition 1966, edited by Dr. R. Vieweg and Dr. A. Höchtlen, 2nd edition 1983, edited by Dr. Günter Oertel, and 3rd edition 1993, edited by Dr. Günter Oertel, Carl Hanser Verlag, Munich, Vienna.

They are usually produced by reacting polyisocyanates with compounds having at least two hydrogen atoms which are reactive toward isocyanate groups in the presence of catalysts, blowing agents and also auxiliaries and/or additives.

A significant challenge for rigid foams is shortening of the demolding time without the mechanical or processing properties being impaired. Furthermore, the starting materials for producing the rigid foams should have a good solvent capability for the blowing agent, in particular when using hydrocarbons as blowing agents, so as to obtain foams having very low densities. In practice, the different properties of the foams are usually obtained by use of different polyols.

It is known that polyols having a very high functionality have a very high viscosity, so that they cannot be used in formulations which are still processable in customary production units.

Furthermore, it is known that polyether alcohols initiated by means of amines, in particular aromatic amines and preferably vicinal toluenediamine (TDA) display a particularly good solvent capability for a hydrocarbon-containing blowing agent. For the purposes of the invention, the term vicinal TDA refers to the ortho isomers of TDA.

It is known from EP 1 138 709 that rigid foams having a good flowability can be produced when the compounds having at least two hydrogen atoms which are reactive toward isocyanate groups comprise at least one polyether alcohol which has a hydroxyl number of from 100 to 250 mg KOH/g and has been prepared by addition of alkylene oxides onto H-functional starter substances having from 2 to 4 active hydrogen atoms, in particular glycols, trimethylolpropane, glycerol, pentaerythritol or TDA.

However, these systems do not yet meet all the requirements of the industry

It was an object of the invention to provide a process for producing rigid polyurethane foams which displays a shortened demolding time, has a viscosity of the polyol component which is not too high and allows processing in production according to the prior art and displays a high solubility of the blowing agents to produce low foam densities in the component.

This object has surprisingly been achieved by the use of a mixture of a TDA-initiated polyether alcohol having a hydroxyl number of from 360 to 450 mg KOH/g, a polyether alcohol which has been initiated using sucrose and/or sorbitol and has a hydroxyl number of from 380 to 480 mg KOH/g and a polyether alcohol which has been initiated using 3- or 4-functional alcohols, 1- or 2-functional amines or amino alcohols or castor oil and has a hydroxyl number of from 140 to 250 mg KOH/g.

The invention accordingly provides a process for producing rigid polyurethane foams by reacting
a) polyisocyanates with
b) compounds having at least two hydrogen atoms which are reactive toward isocyanate groups in the presence of
c) blowing agents, wherein a mixture of
b1) a polyether alcohol which has a hydroxyl number of from 360 to 450 mg KOH/g and a viscosity at 25° C. of greater than 12 000 mPa·s and can be prepared by addition of ethylene oxide and/or propylene oxide onto TDA,
b2) a polyether alcohol which has a functionality of from 5 to 7.5 and a hydroxyl number of from 380 to 480 mg KOH/g and can be prepared by addition of propylene oxide onto sorbitol and/or sucrose, preferably sucrose,
b3) a polyether alcohol which has a functionality of from 2 to 4 and a hydroxyl number of from 140 to 250 mg KOH/g and can be prepared by addition of ethylene oxide and propylene oxide onto TDA or amines other than TDA or of propylene oxide onto 2-, 3- or 4-functional alcohols or castor oil derivatives, is used as compounds b) having at least two hydrogen atoms which are reactive toward isocyanate groups.

The polyols b1) are preferably used in an amount of from 10 to 50% by weight, the polyols b2) are preferably used in an amount of from 25 to 80% by weight and the polyols b3) are preferably used in an amount of from 10 to 25% by weight, in each case based on the sum of the polyols b1), b2) and b3).

The polyol b1) is prepared by addition of ethylene oxide and/or propylene oxide onto TDA. In principle, it is possible to use all TDA isomers. Preference is given to using TDA having a content of at least 70% by weight, particularly preferably at least 80% by weight and in particular at least 85% by weight, of vicinal TDA. Such mixtures are obtained in the work-up of TDA in the preparation of TDI. Polyether alcohols derived from TDA having the abovementioned content of vicinal TDA have an improved solvent capability for blowing agents, in particular hydrocarbons such as pentane.

As described, the polyols b1) can be prepared either by addition of propylene oxide only onto TDA or by addition of ethylene oxide only onto TDA. The polyols b1) preferably contain not more than 25% by weight, based on the weight of the polyether alcohol, of ethylene oxide.

In the preparation of the polyether alcohols b1), preference is given to adding ethylene oxide onto the starter substance first, preferably in an amount of from 5 to 25% by weight, based on the weight of the polyether alcohol The addition reaction of the ethylene oxide can also preferably be carried out without addition of a catalyst. After the addition reaction of the ethylene oxide, the propylene oxide is added on, if appropriate in admixture with further ethylene oxide, preferably using a basic catalyst, in particular potassium hydroxide. After the addition reaction is complete, the polyether alcohol is worked up to separate off volatile by-products, neutralizing the basic catalyst and separating off the salts formed.

The polyols b1) have, as described, a functionality of not more than 4, a hydroxyl number of from 360 to 450 mg KOH/g and a viscosity of from 12 000 to 75 000 mPa·s at 25° C., determined using a rotational viscometer Pheotec RC 20 using the spindle CC 25 DIN (spindle diameter: 12.5 mm; internal diameter of measuring cylinder: 13.56 mm) at a shear rate of 50 1/s.

The polyol b2) is prepared by addition of propylene oxide onto sucrose and/or sorbitol. The addition of the propylene oxide onto the sucrose or sorbitol is usually carried out in the presence of liquid coinitiators Coinitiators used are, for example, water and/or alcohols which are liquid at the reaction temperature, preferably glycerol, ethylene glycol, diethylene glycol, propylene glycol or dipropylene glycol, if the functionality of the polyols is to be particularly high, glycerol is preferably used as coinitiator. The polyols b2) preferably have a content of free sucrose of less than 0.05% by weight and a content of glycols which have not been used as coinitiators of less than 3% by weight, in each case based on the weight of the polyether alcohol b1). In particular, it is advantageous for the content of free sucrose in the mixture of b1), b2) and b3) to be less than 0.03% by weight, based on the mixture of b1), b2) and b3).

The addition reaction of the propylene oxide is usually carried out in the presence of catalysts, preferably basic catalysts and in particular potassium hydroxide.

After the addition reaction of the alkylene oxide, the workup is carried out as described for polyol b1).

The polyols b2) preferably have a viscosity of from 15 000 to 80 000 mPa·s, determined at 25° C. using a rotational viscometer Rheotec RC 20 using the spindle CC 25 DIN (spindle diameter: 12.5 mm; internal diameter of the measuring cylinder: 13.56 mm) at a shear rate of 50 1/s.

Polyether alcohols having a similar structure and a higher hydroxyl number and a higher functionality than b2) have an excessively high viscosity and, in addition, give a moderate demoldability, while polyether alcohols having a similar structure and a lower viscosity and a higher functionality do have a low viscosity but likewise display poor demoldability.

The polyols b3) are prepared by addition of propylene oxide onto low molecular weight alcohols, in particular alcohols having a molecular weight of less than 400, or amines. Examples of low molecular weight alcohols are glycols such as ethylene glycol, propylene glycol and their higher homologues, glycerol, trimethylolpropane and pentaerythritol. Examples of amines are TDA, with the TDA preferably having the content of vicinal TDA described under polyol b1), ethylenediamine or, if appropriate, monoalkyl- and dialkyl-substituted ethylenediamine, ammonium, aniline and triethanolamine or mixtures comprising predominantly triethanolamine or, if appropriate, monoalkyl, dialkyl- and trialkyl-substituted triethanolamine. In the preparation of polyols b3) which are initiated by means of TDA, it can be advantageous, as described for the polyols b1), firstly to add on ethylene oxide in the absence of a catalyst and then add on propylene oxide in the amounts described for b1) using a basic catalyst.

The polyols b3) preferably have a viscosity of less than 1000 mPa·s, determined at 25° C. using a rotational viscometer Rheotec RC 20 using the spindle CC 25 DIN (spindle diameter: 12.55 mm; internal diameter of the measuring cylinder: 13.56 mm) at a shear rate of 50 1/s.

As regards the other starting materials used in the process of the invention, the following may be said.

Polyisocyanates used are the customary aliphatic, cycloaliphatic and in particular aromatic diisocyanates and/or polyisocyanates. Preference is given to using tolylene diisocyanate (TDI) diphenylmethane diisocyanate (MDI) and in particular mixtures of diphenylmethane diisocyanate and polyphenylenepolymethylene polyisocyanates (crude MDI). The isocyanates can also be modified, for example by incorporation of uretdione, carbamate, isocyanurate, carbodiimide, allophanate and in particular urethane groups.

To produce rigid polyurethane foams use is made of, in particular crude MDI. In a preferred embodiment of the process of the invention, a crude MDI having an NCO content of from 29 to 33% by weight and a viscosity of about 200 mPa·s at 25° C. is used. These compounds preferably have a proportion of 2-ring MDI of about 40% by weight a proportion of 3-ring MDI of about 25% by weight and a proportion of 4-ring MDI of about 8% by weight. The remainder is made up of higher homologues.

In a further preferred embodiment of the process of the invention a mixture of a crude MDI a1) and a crude MDI a2) is used.

The component a1) has an NCO content of from 30 to 32% by weight and a viscosity of about 2000 mPa·s, in particular from 2000 to 2200 mPa·s at 25° C. The component a1) preferably has a proportion of 2-ring MDI of from 22 to 28% by weight, a proportion of 3-ring MDI of from 26 to 34% by weight and a proportion of 4-ring MDI of from 5 to 11% by weight in each case based on the weight of the component a1). The remainder is made up of higher homologues.

The component a2) has an NCO content of from 30 to 32% by weight and a viscosity of about 100 mPa·s, preferably from 100 to 120 mPa·s, at 25° C. The component a2) preferably has a proportion of 2-ring MDI of from 43 to 53% by weight, a proportion of 3-ring MDI of from 20 to 26% by weight and a proportion of 4-ring MDI of from about 5 to 9% by weight in each case based on the weight of the component a2). The remainder is made up of higher homologues.

The mixture of a1) and a2) preferably has a proportion of 2-ring MDI of from 25 to 38% by weight and a viscosity of from 250 to 1000 mPa·s at 25° C.

The viscosity of the polyisocyanates a1) and a2) and of the mixture of a1) and a2) is likewise determined at 25° C. using a rotational viscometer Rheotec RC 20 using the spindle CC 25 DIN (spindle diameter: 12.5 mm; internal diameter of the measuring cylinder 13.56 mm) at a shear rate of 50 1/s.

For various applications, it is advantageous to incorporate isocyanurate groups into the polyisocyanate.

This is preferably achieved using catalysts which form isocyanurate groups, for example alkali metal salts such as potassium octoate and/or potassium acetate, either alone or in combination with tertiary amines. Isocyanurate formation leads to flame-resistant foams which are preferably used in industrial rigid foam, for example in building and construction as insulation boards or sandwich elements. Isocyanurate formation can occur to an increased extent at temperatures above 60° C.

The mixture of the polyols b1), b2) and b3) is preferably used as sole component b). However, it can be advantageous to use further compounds having at least two hydrogen atoms which are reactive toward Isocyanate groups in combination with the polyols mentioned. In this case, the mixture of the components b1), b2) and b3) is used in an amount of at least 70% by weight, based on the weight of the component b).

Compounds b) having at least two hydrogen atoms which are reactive toward isocyanate groups which can be used together with the above-described polyols b1), b2) and b3) are, in particular, compounds which have two or more reactive groups selected from among OH groups, SH groups, NH groups, $NH_2$ groups and CH-acid groups, e.g. β-diketone groups, in the molecule. Preference is given to using polyester alcohols and/or polyether alcohols.

The polyester alcohols used together with the polyether alcohols b1), b2) and b3) used according to the invention are usually prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, dodecanedicarboxylic acid, maleic acid, fumaric acid and preferably phthalic acid, isophthalic acid, terephthalic acid and isomeric naphthalenedicarboxylic acids.

The polyether alcohols used together with the polyether alcohols b1), b2) and b3) used according to the invention usually have a functionality of from 2 to 8, in particular from 4 to 8.

In particular, polyether polyols prepared by known methods, for example by anionic polymerization of alkylene oxides in the presence of alkali metal hydroxides, are used as polyhydroxy compounds.

As alkylene oxides, preference is given to using ethylene oxide and 1,2-propylene oxide. The alkylene oxides can be used individually, alternately in succession or as mixtures.

Examples of suitable starter molecules are: water, organic dicarboxylic acids such as succinic acid, adipic acid, phthalic acid and terephthalic acid, aliphatic and aromatic, unsubstituted or N-monoalkyl-, N,N-dialkyl- and N,N'-dialkyl-substituted diamines having from 1 to 4 carbon atoms in the alkyl radical, for example unsubstituted or monoalkyl- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, aniline, phenylenediamines, 2,3-, 2,4-, 3,4- and 2,6-toluenediamine and 4,4'-, 2,4'- and 2,2'-diaminodiphenylmethane.

Further possible starter molecules are: alkanolamines such as ethanolamine, N-methyl-ethanolamine and N-ethylethanolamine, dialkanolamines such as diethanolamine, N-methyldiethanolamine and N-ethyldiethanolamine and trialkanolamines such as triethanolamine and ammonia.

It is also possible to use polyhydric, in particular dihydric and/or trihydric, alcohols such as ethanediol, 1,2- and 1,3-propanediol, diethylene glycol, dipropylene glycol, 1,4-butanediol, 1,6-hexanediol, glycerol, pentaerythritol, sorbitol and sucrose, polyhydric phenols such as 4,4'-dihydroxydiphenylmethane and 2,2-di(4-hydroxyphenyl)propane, resols such as oligomeric condensation products of phenol and formaldehyde and Mannich condensates of phenols, formaldehydes and dialkanolamines and also melamine.

The polyether polyols have a functionality of preferably from 3 to 8 and in particular from 3 to 6 and hydroxyl numbers of preferably from 120 mg KOH/g to 770 mg KOH/g and in particular from 240 mg KOH/g to 570 mg KOH/g, with the respective values differing from those of the polyols b1), b2) and b3).

Further information on the polyether alcohols and polyester alcohols used and their preparation may be found, for example, in the Kunststoffhandbuch, Volume 7 "Polyurethane", edited by Günter Qertel, Cari-Hanser-Verlag Munich, 1993.

The compounds having at least two hydrogen atoms which are reactive toward isocyanate groups also include any chain extenders and crosslinkers which may be concomitantly used. However, the addition of bifunctional chain extenders, trifunctional and higher-functional crosslinkers or, if appropriate, mixtures thereof can prove to be advantageous for modifying the mechanical properties. As chain extenders and/or crosslinkers, preference is given to using alkanolamines and in particular diols and/or triols having molecular weights of less than 400, preferably from 60 to 300.

If chain extenders, crosslinkers or mixtures thereof are employed for producing the rigid polyurethane foams, they are advantageously used in an amount of from 0 to 20% by weight, preferably from 2 to 5% by weight, based on the weight of the compounds b) having at least two hydrogen atoms which are reactive toward isocyanate groups.

The process of the invention is usually carried out in the presence of blowing agents, catalysts and, if required, auxiliaries and/or additives.

As blowing agent c), it is possible, for example, to use water which reacts with isocyanate groups to eliminate carbon dioxide. In place of but preferably in combination with water, it is also possible to use physical blowing agents. These are compounds which are inert toward the starting components, are usually liquid at room temperature and vaporize under the conditions of the urethane reaction. The boiling point of these compounds is preferably below 110° C., in particular below 80° C. Physical blowing agents also include inert gases which are introduced into or dissolved in the starting components, for example carbon dioxide, nitrogen or noble gases.

The compounds which are liquid at room temperature are usually selected from the group consisting of alkanes and/or cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

Examples which may be mentioned are propane, n-butane, isobutane and cyclobutane, n-pentane, isopentane and cyclopentane, cyclohexane, dimethyl ether, methyl ethyl ether, methyl butyl ether, and methyl formate, acetone and fluoroalkanes which are degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and 1,1,1,2,3,3,3-heptafluoropropane and also perfluoroalkanes such as:

$C_3F_8$, $C_4F_{10}$, $C_5F_{12}$, $C_6F_{14}$ and $C_7F_{17}$. The physical blowing agents mentioned can be used alone or in any combinations with one another. Preference is given to using pentane isomers, in particular cyclopentane, as physical blowing agents.

Catalysts used are, in particular, compounds which strongly accelerate the reaction of the isocyanate groups with the groups which are reactive toward isocyanate groups. Use is made, in particular, of organic metal compounds, preferably organic tin compounds such as tin(II) salts of organic acids.

Strongly basic amines can also be used as catalysts. Examples are secondary aliphatic amines, imidazoles, amidines, triazines and alkanolamines.

The catalysts can, depending on requirements, be used alone or in any mixtures with one another.

Auxiliaries and/or additives used are the materials known per se for this purpose, for example surface-active substances, foam stabilizers, cell regulators, fillers, pigments, dyes, flame retardants, hydrolysis inhibitors, antistatics, fungistatic and bacteriostatic agents.

Further information regarding the starting materials, blowing agents, catalysts and auxiliaries and/or additives used for carrying out the process of the invention may be found, for example, in the Kunststoffhandbuch, Volume 7, "Polyurethane" Carl-Hanser-Verlag Munich, 1st edition, 1966, 2nd edition, 1983, and 3rd edition, 1993.

To produce the rigid polyurethane foams, the polyisocyanates a) and the compounds b) having at least two hydrogen atoms which are reactive toward isocyanate groups are reacted in such amounts that the equivalence ratio of NCO groups of the polyisocyanate a) to the sum of the reactive hydrogen atoms of the components b) is 0.85-1.75:1, preferably 1.0-1.3:1 and in particular about 1.0-1.2:1. If the foams comprising urethane groups are modified by the formation of isocyanurate groups, for example to increase the flame resistance, it is usual to employ a ratio of NCO groups of the polyisocyanates a) to the sum of the reactive hydrogen atoms of the component b) of 1.6-60:1, preferably 3.0-8:1.

The rigid foams based on isocyanate can be produced batchwise or continuously by the prepolymer process or preferably by the one-shot process with the aid of known mixing apparatuses.

It has been found to be particularly advantageous to employ the two-component process and to combine the compounds having at least two hydrogen atoms which are reactive toward isocyanate groups with the blowing agents, the catalysts and the auxiliaries and/or additives to form a polyol component and to react this with the polyisocyanates or mixtures of the polyisocyanates and, if appropriate, blowing agents, also known as isocyanate component.

The starting components are mixed at a temperature of from 15 to 90° C., preferably from 20 to 35° C., and introduced into an open mold which may be heated and in which the reaction mixture is allowed to foam essentially without applied pressure in order to avoid a compacted outer zone. To form composite elements, it is advantageous to coat the reverse side of a covering layer, e.g. by casting or spraying, with the foamable reaction mixture and to allow the latter to foam and cure to give the rigid foam. To fill hollow spaces with foam, the reaction mixture is introduced into the hollow space where it foams to fill the entire hollow space; typical degrees of overfilling of the cavities are from 5% to 25%.

The rigid polyurethane foams produced by the process of the invention are preferably used as insulation materials. In particular, they are used for insulating refrigeration appliances or for producing sandwich elements which are preferably produced by the double belt technique. In these, it is possible to use covering layers of metal or plastic. The density of the foams produced by the process of the invention is preferably in the range from 25 to 45 g/l.

The invention is illustrated by the following examples.

Methods:

The viscosity of the polyols and isocyanates at 25° C. was measured using a rotational viscometer Rheotec RC 20 using the spindle CC 25 DIN (spindle diameter: 12.5 mm; internal diameter of the measuring cylinder: 13.56 mm) at a shear rate of 50 1/s.

The thermal conductivity was determined in accordance with DIN 52616. To produce the test specimens, the polyurethane reaction mixture was poured into a mold having the dimensions 200×20×5 cm (10% overfilling) and, after a few hours, a test specimen having dimensions of 20×20×2 cm was cut from the middle.

The compressive strength was determined in accordance with DIN 53421/DIN EN ISO 604.

The proportion of closed cells was determined in accordance with ISO 4590.

EXAMPLES 1 to 15 and COMPARATIVE EXAMPLES 1 to 5

The polyols, catalysts, blowing agents and additives indicated in tables 1 to 3 were combined by stirring at room temperature to form a polyol component. This was foamed with the isocyanate component indicated (tables 1 and 2: isocyanate 1, table 3: cf. table 3) at the index indicated by means of a high-pressure Puromat. The processing parameters and the mechanical properties of the resulting foams are likewise shown in tables 1 to 3.

TABLE 1

|  | Comp. Ex. 1 | Comp. Ex. 2 | Comp. Ex. 3 | Comp. Ex. 4 | Comp. Ex. 5 | Ex. 1 | Ex. 2 | Ex. 3 | Ex. 4 | Ex. 5 |
|---|---|---|---|---|---|---|---|---|---|---|
| Polyol A | 20 |  | 20 | 20 | 20 | 20 | 20 | 20 | 20 | 20 |
| Polyol B |  | 56.6 |  |  |  | 56.6 | 56.6 |  |  |  |
| Polyol C | 18 | 18 | 18 | 18 | 18 | 18 |  |  |  |  |
| Polyol D |  |  |  |  |  |  | 18 | 18 | 18 | 18 |
| Polyol E | 56.6 |  |  |  |  |  |  |  |  |  |
| Polyol F |  | 20 |  |  |  |  |  |  |  |  |
| Polyol G |  |  | 56.6 |  |  |  |  |  |  |  |
| Polyol H |  |  |  | 56.6 |  |  |  |  |  |  |
| Polyol I |  |  |  |  | 56.6 |  |  |  |  |  |
| Polyol J |  |  |  |  |  |  |  | 56.6 |  |  |
| Polyol K |  |  |  |  |  |  |  |  | 56.6 |  |
| Polyol L |  |  |  |  |  |  |  |  |  | 56.6 |
| Stabillizer | 2 | 2 | 2 | 2 | 2 | 2 | 2 | 2 | 2 | 2 |
| Water | 2.3 | 2.3 | 2.3 | 2.3 | 2.3 | 2.3 | 2.3 | 2.3 | 2.3 | 2.3 |
| Catalyst | 1.8 | 1.2 | 1.2 | 0.9 | 0.9 | 0.9 | 2.5 | 2.0 | 2.2 | 0.6 |
| Cyclopentane | 9.8 | 9.8 | 9.8 | 9.8 | 9.8 | 9.8 | 9.8 | 9.8 | 9.8 | 9.8 |
| Isopentane | 4.2 | 4.2 | 4.2 | 4.2 | 4.2 | 4.2 | 4.2 | 4.2 | 4.2 | 4.2 |
| Viscosity of polyol [mPas], 20° C., without blowing agent | 7000 | 6200 | 5500 | 17000 | 17000 | 5500 | 10000 | 10000 | 13000 | 7000 |
| Mixing ratio 100: | 131 | 125 | 131 | 142 | 106 | 126 | 124 | 118 | 118 | 120 |
| Index | 117 | 117 | 117 | 117 | 117 | 117 | 117 | 117 | 117 | 117 |
| Fiber time [s] | 40 | 42 | 37 | 44 | 40 | 39 | 37 | 42 | 40 | 39 |
| Free-foamed density [g/l] | 24.1 | 23.4 | 24.0 | 23.6 | 23.8 | 24.4 | 24.3 | 24.4 | 24.4 | 24.2 |
| Minimum fill density [g/l] | 31.6 | 30.6 | 31.5 | 31.9 | 31.7 | 31.9 | 32.1 | 32.3 | 32.5 | 32.2 |
| Flow factor (min. fill density/free-foamed density) | 1.31 | 1.31 | 1.31 | 1.35 | 1.33 | 1.31 | 1.32 | 1.32 | 1.33 | 1.33 |
| Proportion of open cells [%] | 5 | 6 | 4 | 7 | 5 | 6 | 7 | 5 | 4 | 6 |
| Thermal conductivity [mW/mK] | 19.5 | 20.3 | 19.6 | 20.2 | 20.5 | 19.7 | 19.6 | 19.8 | 19.7 | 19.9 |

TABLE 1-continued

|  | Comp. Ex. 1 | Comp. Ex. 2 | Comp. Ex. 3 | Comp. Ex. 4 | Comp. Ex. 5 | Ex. 1 | Ex. 2 | Ex. 3 | Ex. 4 | Ex. 5 |
|---|---|---|---|---|---|---|---|---|---|---|
| Compressive strength (RD 31) 20% OP, [N/mm$^2$] | 16.5 | 16.1 | 16.3 | 16.7 | 15.9 | 16.2 | 16.0 | 15.8 | 15.9 | 16.1 |
| Further rise after 24 h, 3 min. 20% overpack [mm] | 95.3 | 96.1 | 96.1 | 97.8 | 97.3 | 94.5 | 94.8 | 94.2 | 94 | 94.3 |

TABLE 2

|  | Comp. Ex. 1 | Ex. 6 | Ex. 7 | Ex. 8 | Ex. 9 | Ex. 10 | Ex. 11 | Ex. 12 | Ex. 13 |
|---|---|---|---|---|---|---|---|---|---|
| Polyol A | 20 | 20 | 20 | 20 | 20 | 20 | 20 |  |  |
| Polyol B |  | 56.6 | 56.6 | 56.6 | 56.6 | 56.6 | 56.6 | 56.6 | 56.6 |
| Polyol C | 18 | 18 | 18 |  |  |  |  |  | 18 |
| Polyol E | 56.6 |  |  |  |  |  |  |  |  |
| Polyol M |  |  |  | 18 |  |  |  | 18 |  |
| Polyol N |  |  |  |  | 18 |  |  |  |  |
| Polyol O |  |  |  |  |  | 18 |  |  |  |
| Polyol P |  |  |  |  |  |  | 18 |  |  |
| Polyol Q |  |  |  |  |  |  |  | 20 | 20 |
| Stabilizer | 2 | 2 | 2 | 2 | 2 | 2 | 2 | 2 | 2 |
| Water | 2.3 | 2.3 | 2.3 | 2.3 | 2.3 | 2.3 | 2.3 | 2.3 | 2.3 |
| Catalyst | 1.8 | 0.9 | 0.9 | 2.5 | 2.2 | 0.6 | 0.6 | 0.6 | 2.0 |
| Cyclopentane | 9.8 |  | 12 | 9.8 | 9.8 | 9.8 | 9.8 | 9.8 | 9.8 |
| Isopentane | 4.2 |  | 2 | 4.2 | 4.2 | 4.2 | 4.2 | 4.2 | 4.2 |
| Isobutane |  | 35 |  |  |  |  |  |  |  |
| 245fa |  | 35 |  |  |  |  |  |  |  |
| Viscosity of polyol [mPas], 20° C., without blowing agent | 7000 | 5500 | 5500 | 4000 | 5000 | 5000 | 5000 | 5000 | 4500 |
| Mixing ratio 100: | 131 | 106 | 126 | 122 | 124 | 126 | 126 | 122 | 123 |
| Index | 117 | 117 | 117 | 117 | 117 | 117 | 117 | 117 | 117 |
| Fiber time [s] | 40 | 38 | 41 | 37 | 40 | 38 | 38 | 38 | 42 |
| Free-foamed density [g/l] | 24.1 | 22.5 | 23.0 | 23.5 | 23.3 | 23.0 | 23.3 | 23.2 | 23.4 |
| Minimum fill density [g/l] | 31.6 | 28.8 | 31.0 | 30.5 | 30.8 | 30.4 | 30.0 | 30.1 | 30.6 |
| Flow factor (min. fill density/free-foamed density) | 1.31 | 1.3 | 1.35 | 1.30 | 1.32 | 1.32 | 1.29 | 1.30 | 1.31 |
| Proportion of open cells [%] | 5 | 5 | 4 | 6 | 4 | 6 | 5 | 6 | 5 |
| Thermal conductivity [mW/mK] | 19.5 | 17.9 | 19.8 | 19.6 | 19.7 | 19.7 | 19.5 | 19.6 | 19.8 |
| Compressive stength (RD 31) 20% OP, [N/mm$^2$] | 16.5 | 15.4 | 16.5 | 16.3 | 16.4 | 16.6 | 16.2 | 16.5 | 16.2 |
| Further rise after 24 h, 3 min. 20% overpack [mm] | 95.3 | 94.6 | 94.5 | 94.3 | 94.5 | 94.5 | 94.7 | 94.7 | 94.8 |

TABLE 3

|  | Comp. Ex. 1 | Ex. 12 | Ex. 13 | Ex. 14 | Ex. 15 |
|---|---|---|---|---|---|
| Polyol A | 20 | 20 | 20 | 20 | 20 |
| Polyol B |  | 56.6 | 56.6 | 56.6 | 56.6 |
| Polyol C | 18 | 18 | 18 | 18 | 18 |
| Polyol E | 56.6 |  |  |  |  |
| Stabilizer | 2 | 2 | 2 | 2 | 2 |
| Water | 2.3 | 2.3 | 2.3 | 2.3 | 2.3 |
| Catalyst | 1.8 | 0.9 | 1.2 | 1.2 | 0.9 |
| Cyclopentane | 9.8 | 9.8 | 9.8 | 9.8 | 9.8 |
| Isopentane | 4.2 | 4.2 | 4.2 | 4.2 | 4.2 |
| Isocyanate 3 |  |  | 27 | 64 | 80 |
| Isocyanate 1 | 131 | 126 |  |  |  |
| Isocyanate 2 |  |  | 102 | 64 | 47 |
| Viscosity of polyol [mPas], 20° C. without blowing agent | 7000 | 5500 | 5500 | 5500 | 5500 |
| Mixing ratio 100: | 131 | 126 | 129 | 128 | 127 |
| Index | 117 | 117 | 117 | 117 | 117 |
| Fiber time [s] | 40 | 38 | 42 | 40 | 41 |
| Free-foamed density [g/l] | 24.1 | 24.4 | 23.4 | 24.0 | 23.6 |
| Minimum fill density [g/l] | 31.6 | 31.9 | 30.6 | 31.5 | 31.9 |
| Flow factor (min. fill density/free-foamed density) | 1.31 | 1.31 | 1.39 | 1.37 | 1.34 |

TABLE 3-continued

|  | Comp. Ex. 1 | Ex. 12 | Ex. 13 | Ex. 14 | Ex. 15 |
|---|---|---|---|---|---|
| Proportion of open cells [%] | 5 | 6 | 6 | 4 | 7 |
| Thermal conductivity [mW/mK] | 19.5 | 19.7 | 20.3 | 19.1 | 19.2 |
| Compressive strength (RD 31) 20% OP, [N/mm²] | 16.5 | 16.2 | 16.1 | 16.3 | 16.7 |
| Further rise after 24 h 3 min. 20% overpack [mm] | 95.3 | 94.5 | 93.3 | 93.6 | 93.9 |

Raw Materials Used:

Polyol A: Polyether alcohol derived from vicinal TDA, ethylene oxide and propylene oxide, ethylene oxide content: 15%, functionality: 3.8, hydroxyl number: 400, viscosity: 17 000 mPa·s at 25° C.

Polyol B: Polyether alcohol derived from sucrose, glycerol and propylene oxide, functionality: 5.1, hydroxyl number: 450, viscosity: 20 000 mPa·s at 25° C.

Polyol C: Polyether alcohol derived from trimethylolpropane and propylene oxide, functionality: 3, hydroxyl number: 160, viscosity: 300 mPa·s at 25° C.

Polyol D: Polyether alcohol derived from vicinal TDA, ethylene oxide and propylene oxide, functionality: 4, hydroxyl number: 200, viscosity: 300 mPa·s at 25° C.

Polyol E: Polyether alcohol derived from sorbitol and propylene oxide, functionality: 5, hydroxyl number: 490, viscosity: 20 000 mPa·s at 25° C.

Polyol F: Polyether alcohol derived from vicinal TDA, ethylene oxide and propylene oxide, ethylene oxide content: 22%, functionality: 3.8, hydroxyl number: 400, viscosity: 9000 mPa·s at 25° C.

Polyol G: Polyether alcohol derived from sucrose, glycerol and propylene oxide, functionality: 4.4, hydroxyl number: 490, viscosity: 8000 mPa·s at 25° C.

Polyol H: Polyether alcohol derived from sucrose, propylene glycol and propylene oxide, functionality: 6.5, hydroxyl number: 570, viscosity: 145 000 mPa·s at 25° C.

Polyol I: Polyether alcohol derived from sucrose and propylene oxide, functionality: 7.5, hydroxyl number: 310, viscosity: 2000 mPa·s at 25° C.

Polyol J: Polyether alcohol derived from sucrose, glycerol and propylene oxide, functionality: 6, hydroxyl number: 460, viscosity: 40 000 mPa·s at 25° C.

Polyol K: Polyether alcohol derived from sucrose, glycerol and propylene oxide, functionality: 7, hydroxyl number: 400, viscosity: 25 000 mPa·s at 25° C., Polyol L: Polyether alcohol derived from sucrose, glycerol and propylene oxide, functionality: 5.8, hydroxyl number: 400, viscosity: 12 000 mPa·s at 25° C.

Polyol M: Polyether alcohol derived from triethanolamine and propylene oxide, functionality: 3, hydroxyl number: 140, viscosity: 100 mPa·s at 25° C.

Polyol N: Polyether alcohol derived from ethylenediamine and propylene oxide, functionality: 45 hydroxyl number: 160, viscosity: 100 mPa·s at 25° C.

Polyol O: Polyether alcohol derived from aniline and propylene oxide, functionality: 2, hydroxyl number: 160, viscosity: 300 mPa·s at 25° C.

Polyol P: Polyether alcohol derived from glycerol and propylene oxide, functionality: 3, hydroxyl number: 160, viscosity: 200 mPa·s at 25° C.

Polyol Q: Polyether alcohol derived from vicinal TDA, ethylene oxide and propylene oxide, functionality: 3.8, hydroxyl number: 380, viscosity: 10 000 mPa·s at 25° C.

Isocyanate 1: PMDI, viscosity: 200 mPa·s [25° C.], NCO content: 31% by weight

Isocyanate 2: PMDI, viscosity: 2000 mPa·s [25° C.], NCO content: 31% by weight

Isocyanate 3: PMDI, viscosity: 100 mPa·s [25° C.], NCO content: 31% by weight

Stabilizer: Tegostab® B 8462, Degussa AG

Catalyst: Mixture of 1.4 parts of dimethylcyclohexylamine, 0.5 part of pentamethyldiethylenetriamine, 0.4 part of N600, BASF AG It can be seen that the foams produced according to the invention have a better demoldability, which can be seen from the lower values for the further rise after 24 hours.

The invention claimed is:

1. A process for producing rigid polyurethane foams, comprising:
reacting at least one polyisocyanate with a mixture of compounds having at least two hydrogen atoms which are reactive toward isocyanate groups in the presence of blowing agents,
wherein
the mixture of compounds having at least two hydrogen atoms reactive toward isocyanate groups comprises:
from 10 to 50% by weight of a polyether alcohol which has a hydroxyl number of from 360 to 450 mg KOH/g and a viscosity at 25° C. of greater than 12 000 mPa·s obtained by addition of ethylene oxide and/or propylene oxide to a TDA comprising a vicinal TDA,
from 25 to 80% by weight of a polyether alcohol which has a functionality of from 5 to 7.5 and a hydroxyl number of from 380 to 480 mg KOH/g obtained by addition of propylene oxide to sorbitol and/or sucrose, and
from 10 to 25% by weight of a polyether alcohol which has a functionality of from 2 to 4 and a hydroxyl number of from 140 to 250 mg KOH/g obtained by addition of ethylene oxide and propylene oxide to TDA or amines other than TDA or of propylene oxide to 2-, 3- or 4-functional alcohols or castor oil derivatives, and
wherein the polyether alcohol obtained from sorbitol and/or sucrose consists of propylene oxide, sorbitol and/or sucrose and an optional liquid coinitiator, and
wherein the at least one polyisocyanate comprises:
a mixture of a polyisocyanate having an NCO content of from 30 to 32% by weight and a viscosity of from 2000 to 2200 mPa·s at 25° C. and a polyisocyanate having an NCO content of from 30 to 32% by weight and a viscosity of from 100 to 120 mPa·s at 25° C.

2. The process according to claim 1, wherein a content of vicinal TDA in the TDA comprising vicinal TDA is at least 70% by weight.

3. The process according to claim 1, wherein the polyol obtained from TDA comprising vicinal TDA has a content of ethylene oxide units of not more than 25% by weight, based on the weight of the polyol.

4. The process according to claim 1, wherein the polyol obtained from sorbitol and/or sucrose has a content of free sucrose of less than 0.05% by weight.

5. The process according to claim 1, wherein the mixture of compounds having at least two hydrogens reactive toward isocyanate has a content of free sucrose of less than 0.03% by weight.

6. The process according to claim 1, wherein the polyisocyanate having a viscosity of from 2000 to 2200 mPa·s has a proportion of 2-ring MDI of from 22 to 28% by weight, a proportion of 3-ring MDI of from 26 to 34% by weight and a proportion of 4-ring MDI of from 5 to 11% by weight, in each case based on the weight of the polyisocyanate having a viscosity of from 2000 to 2200 mPa·s.

7. The process according to claim 1, wherein the polyisocyanate having a viscosity from 100 to 120 mPa·s has a proportion of 2-ring MDI of from 43 to 53% by weight, a proportion of 3-ring MDI of from 20 to 26% by weight and a proportion of 4-ring MDI of from 5 to 9% by weight based on the weight of the polyisocyanate having a viscosity from 100 to 120 mPa·s.

8. The process according to claim 1, wherein the mixture of polyisocyanates has a proportion of 2-ring MDI of from 25 to 38% by weight and a viscosity of from 250 to 1000 mPa·s at 25° C.

9. A rigid polyurethane foam obtained by the process according to claim 1.

10. The rigid polyurethane foam according to claim 9 which has a foam density in the range from 25 to 45 g/l.

11. A method for producing a refrigeration appliance comprising the process for producing a rigid polyurethane foam according to claim 1.

12. A refrigeration appliance comprising the rigid polyurethane foam according to claim 9.

13. The process according to claim 1, wherein the mixture of compounds having at least two hydrogen atoms reactive toward isocyanate groups further comprises compounds having two or more groups reactive to isocyanate groups selected from OH groups, SH groups, NH groups, $NH_2$ groups and CH-acid groups.

14. The process according to claim 13, wherein the compound further comprised in the mixture of compounds having two hydrogen atoms reactive toward isocyanate groups is a polyester alcohol or polyether alcohol.

15. The process according to claim 14, wherein the compound further comprised in the mixture of compounds having two hydrogen atoms reactive toward isocyanate groups is a polyester alcohol obtained by condensation of a diol having 2 to 12 carbon atoms with a polyfunctional carboxylic acid having from 2 to 12 carbon atoms.

16. The process according to claim 14, wherein the compound further comprised in the mixture of compounds having two hydrogen atoms reactive toward isocyanate groups is a polyether alcohol having a functionality of from 2 to 8.

17. The process according to claim 16, wherein the polyether alcohol is an anionic polymerization product of ethylene oxide, propylene oxide or a mixture thereof with a starter molecule selected from the group consisting of water, an organic dicarboxylic acid, an aliphatic alkyl substituted diamine having 1-4 carbon atoms in the alkyl substituent and an aromatic alkyl substituted diamine having 1-4 carbon atoms in the alkyl substituent.

18. The process according to claim 1, wherein the mixture of compounds having at least two hydrogen atoms reactive toward isocyanate groups further comprises at least one selected from a bifunctional chain extender, a trifunctional cross-linker, a higher multifunctional cross-linker than trifunctional and a mixture thereof.

\* \* \* \* \*